Oct. 28, 1941.  B. WALKER  2,260,982

INTERNAL COMBUSTION ENGINE

Filed March 21, 1939  2 Sheets-Sheet 1

INVENTOR.

Brooks Walker

Oct. 28, 1941.                 B. WALKER                    2,260,982
                        INTERNAL COMBUSTION ENGINE
                       Filed March 21, 1939      2 Sheets-Sheet 2
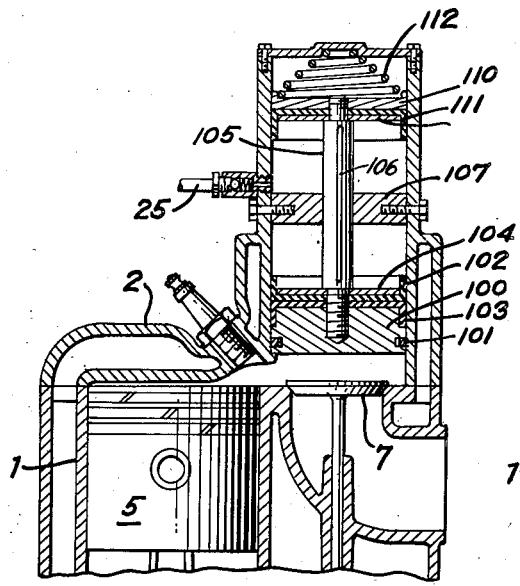
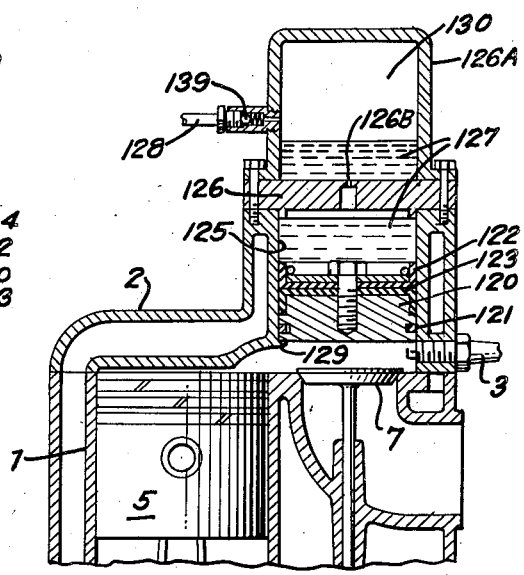
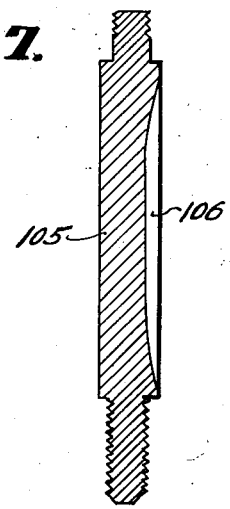
INVENTOR.
Brooks Walker Patented Oct. 28, 1941

2,260,982

UNITED STATES PATENT OFFICE 2,260,982

INTERNAL COMBUSTION ENGINE

Brooks Walker, Piedmont, Calif.

Application March 21, 1939, Serial No. 263,179

5 Claims. (Cl. 123—78)

This invention pertains to improvements in internal combustion engines, particularly relative to a method and structures whereby the compression ratios in the various cylinders may be automatically varied during operating conditions. My two U. S. Letters Patents #1,853,290 and #1,872,856, together with other prior art, fully describe the advantages to be accomplished by varying the compression ratio, and this invention pertains to a different and simplified method of accomplishing the same results.

The variation in the mean pressure acting in each cylinder under all cycles, whether two or four or others, is the actuating medium utilized in this invention for varying the compression ratio under different load conditions, to increase efficiency, particularly at part loads, and also to increase the engine power when the engine is operated in the altitude or under conditions when wire drawing at high speed affects the power output. Hitherto it has been necessary to tie the various devices used for varying the compression ratio in a multi-cylinder engine together mechanically between cylinders so that when the compression ratio in one cylinder is varied, the compression ratios in other cylinders are varied likewise. In this invention I have developed a method by which it is possible to utilize an auxiliary piston in each operating cylinder and by suitable dash pot control to allow the auxiliary piston to only move appreciably during changes of mean internal cylinder pressure under all cycles and not to vary appreciably in position during changes of internal cylinder pressures during the various cycles of operation.

The invention pertains to simplified methods of controlling the auxiliary position, of using the lubricating oil pressure of the engine to maintain and replenish the dampening system for the auxiliary piston, and to other improvements and modifications which will become apparent in the following description.

The invention is illustrated by way of example in the accompanying drawings, in which—

Figs. 4, 5 and 6 are views similar to Figure 1, showing other forms of the invention.

Fig. 7 is an enlarged sectional view of the piston rod illustrated in Fig. 5.

Figure 1:
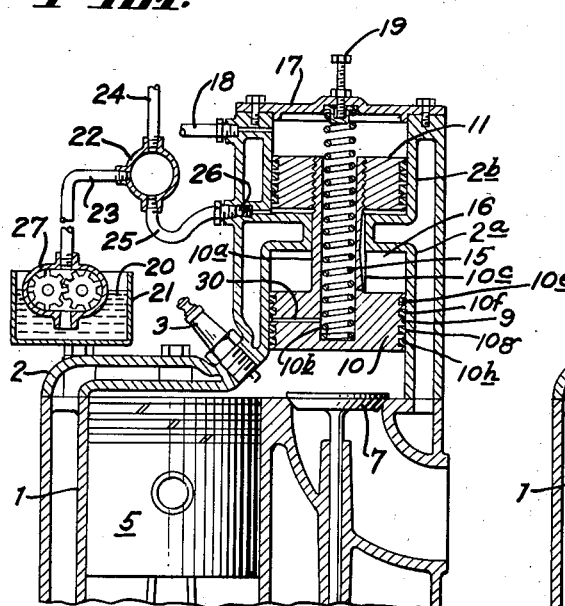
Figure 1 is an end elevation, partly in section and partly diagrammatic, showing a portion of the engine cylinder and the auxiliary piston mechanism and control, and some associated mechanism.

Referring to the drawings 1 to 6 inclusive, like numerals of reference refer to corresponding parts in the various drawings.

With particular reference to Figure 1, the cylinder 1 has a main engine piston 5 reciprocally mounted therein, and this piston is connected to the crank, eccentric, or wobble plate which forms the main engine shaft in the usual or suitable manner, not shown herein inasmuch as these are well known constructions. Cylinder 1 has attached thereto a head casting 2, in which is integrally cast a portion 2—a which is machined to form a cylinder for auxiliary piston 10. Spark plug 3 is suitably located in the cylinder, in any practical location depending on the desire of the designer, to ignite the charge.

Directly in line with auxiliary cylinder 2—a is an auxiliary dash pot cylinder 2—b in which is reciprocally mounted dash pot piston 11, which is rigidly secured by suitable means to the piston rod 10—a, which may be an integral portion of the auxiliary piston 10. This piston rod 10—a is preferably cast, formed or machined with a recess 10—b formed centrally therein and adapted to receive a spring 15, which constantly urges the auxiliary piston 10, dash pot piston 11 and its associated parts downwardly to form a clearance volume for the main engine cylinder which is equivalent to a nine to one compression ratio or more. The tension on said spring 11 can be varied by adjustment screw 19.

It is important that the space between the auxiliary pistons be completely closed so that with the rapid and high magnitude pulsations which the pressures in the explosion chamber of the engine place on the auxiliary pistons, the pistons will be properly snubbed by virtue of the fact that the space between them is completely filled with lubricating oil or other suitable fluid and that any motion of the auxiliary pistons will result in a necessary transfer of some of the fluid in the closed space being transferred through the restriction, thus giving immediate snubbing to even the smallest of motions which might be imparted to the auxiliary pistons by virtue of the fluctuations and pressures of the combustion chamber which act on the lower auxiliary pistons.

It has also been found very beneficial and almost essential that in order to eliminate air and a subsequent emulsion which would form with air and oil being forced through an orifice, that the space between the pistons be supplied with fluid under pressure such as oil from the lubricating system. This serves the purpose of pressure lubrication to the two pistons and elimination of tendency of air to seep in to displace oil leakage, replaces oil leakage by the sealing elements or replaces the oil film which is necessarily left on the cylinder wall on each movement of the piston and is not completely wiped off by the sealing elements but is partially burned off by the combustion of the fuel within the cylinder.

Due to the fact that the spring pressure is urging the two pistons down and the fact that during the suction stroke of the engine a partial vacuum is acting on the lower pistons so that the air pressure on the upper piston tends to push the two pistons down also, there is a tendency to create a partial vacuum below the partition and in the space above the lower auxiliary piston. If the closed snubbing space were not filled with fluid under pressure, there would be a tendency to suck in air or combustion gas, resulting in unsatisfactory action and emulsion. The same condition is reversed when the explosion and compression force the auxiliary pistons up, as then there is a tendency to create a partial vacuum under the upper piston. By supplying the snubbing fluid under pressure, it is possible to compensate for this action and maintain a positive head on the fluids on both sides of the partition although of course the pressure on one side of the partition in operating conditions is usually different from that on the other side, due to the exterior forces acting on the pistons, which the fluid tends to snub in having to pass through the orifice when the two auxiliary pistons move.

The engine has suitably mounted valves 7 which may be of the poppet type as shown, sleeve, rotary, or other suitable types which are not shown inasmuch as they are well known in the art. A cover 17 is suitably attached to the dash pot cylinder 2—b and preferably has a centering recess formed therein to hold the spring 15 in a central position when the adjustment screw is all the way up. The engine crank case 21 shown diagrammatically here carries the engine lubricating supply 20 which may in case of a dry sump construction, such as applied on airplanes, boats, and the like, represent the auxiliary lubricating cooling tank from which the engine oil pump 27 draws its supply. This oil is preferably delivered to a small separating tank 22 by pipe 23. From the top of said separating tank 22, a pipe 24 carries the main portion of the lubricating oil to the desired bearings and other portions of the engine which are to be supplied with lubricating oil. Any air which the pump may pick up through leakage or through a low oil supply when the car goes around turns, stops suddenly, or ascends an unusually steep hill, will go to the bearings in the usual manner without doing the engine any harm. The pipe 25 is attached to the bottom of tank 22 so as to get oil only and no air. This lead is attached to dash pot cylinder 2—b and is admitted below dash pot piston 11 through a check valve 26.

A suitable flat or groove 10—c is formed on the outer surface of piston rod 10—a to form a passage between the space below dash pot piston 11 and auxiliary piston 10. This flat or groove, 10—c, is preferably of variable area, either varying in width or in depth so as to form a smaller passage for the liquid at the extremities of the auxiliary piston travel to increase the snubbing action at the limits of auxiliary piston travel more than the snubbing action at the center of the piston travel. This allows the pistons to move moderately rapidly from a lower position to an upper position when the throttle is suddenly opened and still provides added protection against the pistons hitting the partition or metal stops when approaching the limit of the travel in either direction. The size of this opening and the viscosity of the oil used for dampening, controls the dampening action on the auxiliary piston and its associated dash pot piston.

By this construction it will be seen that through the lubricating oil pressure the space below the dash pot piston 11 and above the auxiliary piston 10 in space 16 will be completely filled with lubricating oil under lubricating oil pressure. This oil will act as the dash pot fluid and it should be noted that the displacement of both pistons 10 and 11 and their associated piston rod 10—a are equal for a given movement of either piston, which being rigidly attached together must each move with the other.

To take care of cylinder leakage by rings 10—h and 10—g, and oil leakage by rings 10—e and 10—f, I have provided a groove 9 between rings 10—f and 10—g, which groove is connected by means of hole 30 to the spring recess 10—h, so that any oil which leaks between ring 10—e and 10—f is by-passed through hole 30 to recess 10—b and out pipe 18, which preferably leads to the crank case of the engine. Likewise any leakage of compression from the main cylinder past rings 10—h and 10—g will pass through hole 30 and back to the crank case through pipe 18 to be handled in the same manner as the blow-by from the main engine piston 5 after it reaches the crank case. Any leakage passing auxiliary piston 11 will be handled in a similar manner through pipe 18.

It has been found by experiment that unless by-pass 30 is provided, the accumulated effect of the engine cylinder pressures will creep up between rings 10—e, 10—f, 10—g, and 10—h, and mix with the dash pot oil in chamber 16, form an emulsion and render the dash pot action unsatisfactory. The amount of leakage in this construction is so small as not to interfere with the lubricating system of the engine and still sufficient to suitably lubricate and cool the auxiliary piston 10. It is also to be pointed out that the lubricating oil going into this dash pot is subject to the cooling of the water of the main engine cylinder which is preferably carried in a water jacket around the auxiliary piston to suitably cool it. A similar installation is preferably made on each of the cylinders of a multi-cylinder engine and by the construction shown the auxiliary piston may be placed in any desired position relative to the cylinder which an engine designer may prefer. The system is completely enclosed, completely lubricated, and results in only one pair of moving parts which are integrally fastened together, per cylinder.

The spring 15 is preferably so calibrated that at sea level when the engine is operating at full throttle and maximum mean effective pressure, the auxiliary piston 10 assumes its maximum raised position towards cover 17 to form the maximum clearance volume in the engine cylinder for maximum mean effective pressure operation.

The dash pot 11 and the groove 10—c are so designed that there will not be appreciable motion of the auxiliary piston between engine cycles. The spring 15 will also be so calibrated and designed as to force the auxiliary piston down against the internal engine pressures so that when the engine is idling at sea level the auxiliary piston 10 will preferably assume its maximum lower position sufficient to result in a peak compression pressure at idling substantially equivalent to the peak compression pressure when the engine is operating at full mean effective pressure. In other words the calibration of the spring 15 is such as to make the auxiliary piston 10 operate substantially as a constant peak compression pressure control.

Figure 2:
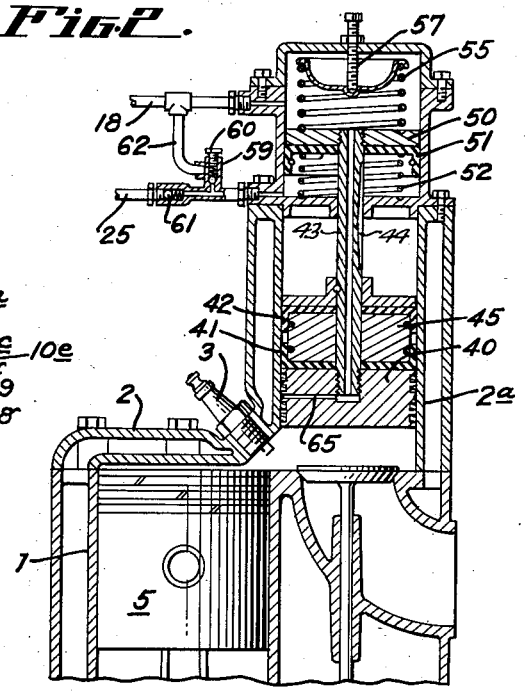
Figure 2 is a view similar to Figure 1, showing another form of the invention.

Figure 2 shows an alternate type of construction, wherein piston rings on the auxiliary piston 40 are supplemented by flexible cups 41 and 42 which are preferably heat resistant and made from some flexible substance such as asbestos, which has been found by experiment to be quite satisfactory. These two cups 41 and 42 preferably face each other, as shown, and have a spacer 45 between them taking up most of the available space. They may use to advantage expanders such as 43 and 44 of coil spring, ring or other suitable type to force the lips of the cup out snugly against the auxiliary cylinder. Likewise the dash pot piston 50 is supplied with a flexible cup 51, which may be held in place by a light spring 52 in a manner similar to that employed on hydraulic brake operating cups. A suitable spring 55 is manually adjusted by screw 57 and this spring is calibrated in a manner similar to spring 15 in Figure 1. Oil pipe 25 is supplied in a manner similar to that shown in Figure 1. However in the case of cup leathers the fluid leakage may be so small and some explosion or other gases may creep by the cups so that it may be desirable to use a spring loaded relief valve 59 with an adjustable screw 60 to vary the spring pressure so that the valve will relieve at some pressure above the lubricating oil pressure and above the pressure resulting from spring 55 acting on dash pot piston 50. In this case a check valve 61 must be placed between the oil supply line 25 and the relief valve 59. Pipe 62 returns any oil which is by-passed to the oil reservoir at the highest point in the oil line leading to the dash pot, any air getting to the dash pot through the oil line to be trapped and by-passed through the relief valve.

With this construction it may be unnecessary to provide the by-pass holes 65 and hollow piston rod 43 for relieving leakage past the piston rings. The rod is provided with a variable slot 44 similar to the slot 10c illustrated in Fig. 1. By facing cups 41 and 42 towards each other, the maximum cylinder pressures will be trapped by the two cups so that with the pulsating pressures existing within the cylinders, (varying from the high explosion pressures to the low section pressures), there will not be a resulting pump action past the cups. In actual practice it has been found that heat resistant flexible cups work very satisfactorily and result in such a negligible leakage that it is doubtful whether a breather pipe 66 would be necessary to return the oil which gets by the dash pot piston 50 and its associated cup 51. It may likewise be found satisfactory to use only one compression ring in auxiliary piston 40, depending upon the cups 41 and 42 to seal this piston. As a matter of fact, if the cups are sufficiently heat resistant and the auxiliary piston 40 fits the auxiliary cylinder 2—A rather closely, the piston rings may be eliminated. Altogether the operation of this auxiliary piston is similar to that described in connection with Figure 1.

Figure 3:
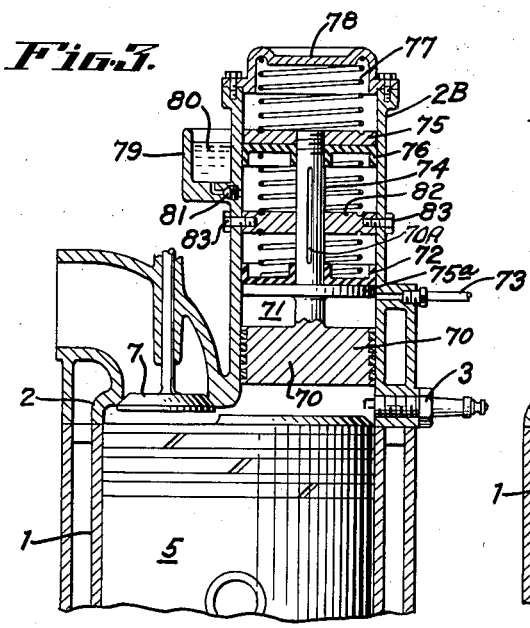
Figure 3 is a view similar to Figure 1, showing another form of the invention.

In Figure 3 I have shown another form of the invention with the engine valve mechanism shown as the overhead type disposed at one side of the center of the piston to facilitate the installation of the auxiliary piston 70 which may be provided with double cups such as described in connection with Figure 2 or with compression rings as shown. The piston 70 is provided with a variable slot 70a, which is similar to the slot 10c illustrated in Fig. 1. In this construction a slight space 71 is provided between the compression rings and the oil cup seal 72. This blow-by space is connected by means of pipe 73 to the crank case or intake manifold to take care of the blowby. The piston rod 74 connects to the auxiliary piston 70 to the dash pot pistons 75 and 75—A, which are each provided with a flexible cup 72 and 76. Spring 77 is preferably calibrated in a manner similar to spring 15, in Figure 1, or may be supplemented or replaced by an air cushion in the spring space, and is retained by cap 78 which is suitably secured to the dash pot cylinder 2—B in an air tight manner if desired.

In this figure an oil reservoir 79 carries a supply of dash pot fluid 80 which may be different than the engine oil and may have different viscosity characteristics such as alcohol and glycerine, or other suitable fluids. This is connected to the dash pot cylinder by means of check valve 81. In Figure 3 the spring 77 may be supplemented or replaced by the compression of the air trapped in the chamber surrounding spring 77 to resist the upward movement of the auxiliary piston 70.

In a similar construction the spring 77 might be eliminated entirely and compression of a gas in the spring chamber could be used as the resilient means for resisting the action of the dash pot piston 75 and the auxiliary piston 70 attached rigidly thereto. In this case it might be desirable to use a double cup on the dash pot piston 75 similar to that used on the auxiliary piston in Figure 2. It is to be noted that in Figure 3 the partition 82 is secured by bolts 83 or in other suitable manner so that upper and lower cylinder bores can be bored in one operation. Also the two pistons 70 and 75 can be withdrawn from the cylinders without removing the main cylinder head 2 or without dismantling the two pistons and their associated connecting rods. This is accomplished by removing the bolts 83 and withdrawing the piston assembly 70 and 75 together with the partition 82. In this construction I wish to point out that where an air cushion is used to replace the spring 77 it may not be necessary to use a piston 75 or a ceiling element 76 but merely allowing the air pressure to act directly on the fluid above the partition 82. In this case the air chamber may need to be charged with air under some predetermined pressure when the piston 70 is in its lower position; said air pressure to simulate the tension in spring 77 at the same lower position, as shown in Figure 6.

Figure 4:
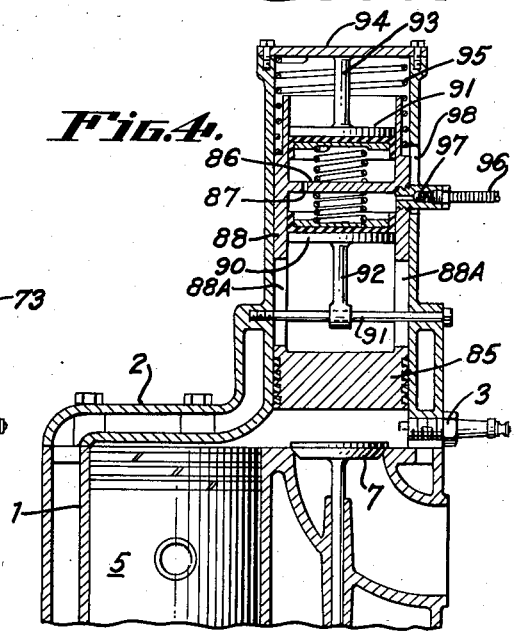

In Figure 4 is shown still another modification of the invention, in which the auxiliary piston 85 is connected to a movable partition 86 with an orifice 87 formed therein. This partition 86 is connected to the auxiliary piston by movable cylinders 88 in which pistons 90 and 91 are located. A slot 88—A allows cross rod 91 to pass through and be rigidly anchored to the cylinder head and to support piston head 90 by means of rod 92. Piston 91 is held rigid by its rod 93, which is securely attached to the plate 94; plate 94 in turn is rigidly secured to the cylinder head 2. By this construction it can be seen that as the auxiliary piston moves up and down against the calibrated spring 95, rapid motion will be resisted by the dash pot fluid having to pass back and forth through orifice 87 in the movable partition 86. Fluid under pressure such as the engine lubricating oil is admitted to the cylinder 88 below the partition 86 through flexible pipe 96 in a manner similar to that in which fluid is supplied to pipe 25 in Figure 1. Check valve 97 is located between pipe 96 and cylinder 88. A suitable slot 98 is provided for the movement of pipe 96 with the cylinder 88 when the auxiliary piston moves up and down automatically.

In this construction, the piston heads 90 and 91 are stationary and are separated from the movable partition 86 with only the dash pot cylinder and dash pot partition 87 moving with the auxiliary piston 85.

The diameter of the dash pot cylinders on both sides of partition 86 should of course be the same diameter so the displacement of the fluid would be the same on both sides for a given travel of the auxiliary piston 85 and partition 86.

In Figure 5 I have shown another form of my invention in which the auxiliary piston 100 is provided with one compression ring 101 and two oppositely faced flexible heat resistant lip seal elements 102 and 103. These are placed back to back and are held in place by washer 104, which is secured by the connecting rod 105 and the auxiliary piston 100. The connecting rod has a variable flat 106 in the diameter thereof, as illustrated in Fig. 7, to form a passage for the dash pot fluid from one side of the partition 107 to the other when the auxiliary piston 100 moves up and down automatically. The variable flat 106 in this case will vary in depth to offer a reduced cross section at the extremes of the auxiliary piston travels to increase the snubbing action towards the extremities of the auxiliary piston travels as described in connection with the passage of Figure 1. The dash pot piston 110 is secured to the opposite end of the piston rod and has a flexible lip element 111 secured thereto.

A spring 112 constantly urges the dash pot piston 110, the piston rod 106 and the auxiliary piston 100 into its lower position of highest compression ratio. As the engine is operated at a load and as the mean engine pressure for all cycles increases, the piston 100 will be forced up against the spring 112 and will result in a lower compression pressure to approximate uniform peak compression pressure under loaded operating conditions. The space between the cup 111 and the cup 102 is preferably filled with a fluid such as the engine lubricating oil under pressure supplied through pipe 25 through the check valve in a manner similar to that described in connection with Figure 1.

The advantage of this type of construction over that shown in Figure 2 is that with the lip seal elements 102 and 103 placed back to back, there is no tendency to build up a pressure between the two lip seal elements as might be the case in Figure 2 where the lip seal elements are faced with the lips towards each other.

The partition 107 in this case is removable in a manner similar to that described in connection with Figure 3 so that the bores of the dash pot cylinder and the auxiliary cylinder in which piston 100 runs can be machined at one operation. This also allows the removal of the auxiliary pistons unit without disassembling the two pistons from the connecting rod and without removing the main head 2 from the engine.

In Figure 6 I have shown another form of the invention in which the auxiliary piston 120 carries one piston ring 121 and two flexible lip seal elements placed back to back, 122 and 123. This auxiliary piston is free to operate in the cylinder 125 and has a stop 129 in the form of a reduced diameter of the bore to prevent the auxiliary piston from going down and intercepting the valves of the engine or coming out of its cylinder bore. Other forms of stops can be used in the nature of a piston rod extending through the partition 126 and with a spring interposed between the rod head and the partition to prevent shock when the auxiliary piston reaches the lower position, thus preventing any hammering. In this case the partition 126 is formed integrally with the bell chamber 126—A, which serves both as an air bell and as a reservoir for some of the operating fluid.

The operating fluid, preferably some form of lubricating non-freezing fluid, is carried above and below partition 126, as indicated at 127. The entire unit 126 and 126—A is secured to the main engine head by suitable bolts and gaskets to form a fluid-tight seal between cylinder 125 and the partition 126. Air or gas under suitable pressure is introduced through pipe 128 and check valve 139 into gas chamber 130 to act as the resilient element to force the auxiliary piston 120 into its lowermost position when the engine is operating under low load conditions.

As the engine load is increased and the internal engine pressures under all cycles increase, the auxiliary piston 120 is forced upward to its increased volume of the compression space. This upward movement is resisted by the fluid 127 above and below the partition 126 and by the gas pressure in chamber 130, which naturally increases as the gas space is reduced. Sudden fluctuations in the motion of the piston 120 are resisted by the dash pot action of the fluid in passing through orifice 126—B in the partition which is of such a suitable size that the auxiliary piston 120 can readily assume its desired position automatically when the load is suddenly changed on the engine, but still forms sufficient resistance so that the auxiliary piston 120 does not move appreciably between engine cycles even when the engine is operating at low speeds. This is probably the cheapest form of any of the constructions shown, as only one piston and no piston rod is involved and only a very short bore is necessary for the main auxiliary piston 120. The difficulty is maintaining over a long period of time and temperature changes a satisfactory spring action from a trapped gas in the chamber 130.

Likewise it is difficult in this construction to replace the fluid in 127 which is used up in the lubrication of the piston 120 or which may over a long period of time leak past the lip seal elements 122 and 123, and the piston ring 121. However, any leakage of fluid could be replaced through lead 128 when the engine is being serviced at regular service intervals.

I do not wish in any way to limit myself to the exact details or mode of operation set forth in this specification and drawings, for it will be obvious that wide departure may be made in the way of details without departing from the spirit and scope of my invention, which is as set forth in the following claims.

I claim as my invention:

1. In an internal combustion engine having an engine cylinder, a combustion space in said cylinder, an auxiliary piston communicating directly with said combustion space, a second piston, yieldable means urging said second piston in one direction, a closed space filled with a liquid between said auxiliary piston and said second piston whereby when one of said pistons moves the other will move also, a restriction in the fluid path between said auxiliary piston and said second piston, said restriction being of variable area depending on the position of said auxiliary piston.

2. In an internal combustion engine having a main engine cylinder, a combustion space for said cylinder, an auxiliary cylinder communicating with said combustion space, a piston in said auxiliary cylinder subject at one side thereof to the pressure in said combustion space, means defining a closed chamber in communication with said auxiliary cylinder at the opposite side of said piston, a liquid filling said closed chamber, a small bleed opening leading into said chamber and adapted to prevent any material liquid flow except in response to mean pressure sustained variations, and resiliently actuated means connected to the piston in the auxiliary cylinder for forcing liquid into said chamber through said bleed opening at a pressure sufficient to balance the effect of a predetermined pressure in said combustion space.

3. In an internal combustion engine having a main engine cylinder, a combustion space for said cylinder, an auxiliary cylinder communicating with said combustion space, a piston in said auxiliary cylinder subject at one side thereof to the pressure in said combustion space, means defining a closed chamber in communication with said auxiliary cylinder at the opposite side of said piston, a liquid filling said closed chamber, a small bleed opening leading into said chamber and adapted to prevent any material liquid flow except in response to mean pressure sustained variations, and resiliently actuated means connected to the piston in the auxiliary cylinder for forcing liquid into said chamber through said bleed opening when the mean pressure in said combustion space falls below a predetermined value.

4. In an internal combustion engine having a main engine cylinder, a combustion space in said cylinder, an auxiliary piston subject to the pressure in said combustion space, yieldable means for urging said piston against the force of the pressure in said combustion space, a second piston rigidly connected to said auxiliary piston, both of said pistons being of equal diameter and moving in line with each other and forming an enclosure of constant volume between said pistons, a liquid filling the space between said pistons, and a restriction in the path of liquid flow between said pistons acting to prevent any material liquid flow except in response to variations in the mean pressure in said combustion space.

5. In an internal combustion engine having a pressure lubricating system, a main engine cylinder, a combustion space in said cylinder, an auxiliary piston subject to the pressure in said combustion space, yieldable means for urging said piston against the force of the pressure in said combustion space, a second piston rigidly connected to said auxiliary piston, both of said pistons being of equal diameter and moving in line with each other and forming an enclosure of constant volume between said pistons, a liquid filling the space between said pistons, a fluid connection from said pressure lubricating system to said enclosure, a check valve for preventing flow from said enclosure through said fluid connection, and a restriction in the path of liquid flow between said pistons acting to prevent any material liquid flow except in response to variations in the mean pressure in said combustion space.

BROOKS WALKER.